United States Patent
Bagchi et al.

(10) Patent No.: US 10,769,138 B2
(45) Date of Patent: Sep. 8, 2020

(54) PROCESSING CONTEXT-BASED INQUIRIES FOR KNOWLEDGE RETRIEVAL

(71) Applicant: International Business Machines Corporation, Armonk, NY (US)

(72) Inventors: Sugato Bagchi, White Plains, NY (US); Kenneth J. Barker, Mahopac, NY (US); Branimir K. Boguraev, Bedford, NY (US); Mihaela A. Bornea, White Plains, NY (US); Adam R. Faulkner, New York, NY (US); Yanpeng Li, Elmsford, NY (US); Siddharth A. Patwardhan, Ridgewood, NJ (US); Sara Rosenthal, Spring Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 15/621,623

(22) Filed: Jun. 13, 2017

(65) Prior Publication Data
US 2018/0357272 A1    Dec. 13, 2018

(51) Int. Cl.
*G06F 16/24*    (2019.01)
*G06F 16/242*   (2019.01)
(Continued)

(52) U.S. Cl.
CPC ...... *G06F 16/243* (2019.01); *G06F 16/24568* (2019.01); *G06F 16/283* (2019.01)

(58) Field of Classification Search
CPC .................................................. G06F 16/243
(Continued)

(56) References Cited

U.S. PATENT DOCUMENTS

| 5,257,185 A | 10/1993 | Farley et al. |
| 5,752,242 A | 5/1998 | Havens |

(Continued)

FOREIGN PATENT DOCUMENTS

| CA | 2541024 A1 | 9/2006 |
| CA | 2812338 A1 | 3/2012 |

(Continued)

OTHER PUBLICATIONS

Ahn et al., "Adaptive visualization for exploratory information retrieval", Information Processing and Management 49, 2013, pp. 1139-1164.

(Continued)

*Primary Examiner* — Syling Yen
(74) *Attorney, Agent, or Firm* — Ryan Lewis; Edell, Shapiro & Finnan, LLC

(57) ABSTRACT

Provided herein are techniques for processing a context-situated inquiry to provide results satisfying the inquiry. An inquiry and its supporting context are processed using natural language processing to determine an interpretation for the inquiry and context, and the interpretation is presented to receive corrective information for the interpretation. The corrective information is applied to the interpretation and content is retrieved based on the interpretation of inquiry and context to produce candidate results for the inquiry. Supplemental information is iteratively received to generate updated candidate results.

20 Claims, 7 Drawing Sheets

(51) Int. Cl.
  *G06F 16/28* (2019.01)
  *G06F 16/2455* (2019.01)
(58) Field of Classification Search
  USPC ......................................................... 707/758
  See application file for complete search history.

(56) References Cited

U.S. PATENT DOCUMENTS

| | | | |
|---|---|---|---|
| 6,385,600 | B1 | 5/2002 | McGuinness et al. |
| 6,901,394 | B2 | 5/2005 | Chauhan et al. |
| 6,964,023 | B2 | 11/2005 | Maes et al. |
| 7,337,158 | B2 | 2/2008 | Fratkina et al. |
| 7,920,682 | B2 | 4/2011 | Byrne et al. |
| 8,027,945 | B1 | 9/2011 | Elad et al. |
| 8,275,803 | B2 | 9/2012 | Brown et al. |
| 8,301,438 | B2 | 10/2012 | Ferrucci et al. |
| 8,311,973 | B1 | 11/2012 | Ladeh |
| 3,417,514 | A1 | 4/2013 | Brown et al. |
| 8,515,888 | B2 | 8/2013 | Ventilla et al. |
| 8,719,201 | B2 | 5/2014 | Forman |
| 8,745,493 | B2 | 6/2014 | McKirchy |
| 8,805,756 | B2 | 8/2014 | Boss et al. |
| 8,903,845 | B2 | 12/2014 | Feild |
| 9,002,773 | B2 | 4/2015 | Bagchi et al. |
| 9,063,975 | B2 | 6/2015 | Isensee et al. |
| 9,213,771 | B2 | 12/2015 | Chen |
| 9,613,317 | B2 | 4/2017 | Beamon et al. |
| 2002/0133355 | A1 | 9/2002 | Ross et al. |
| 2004/0153508 | A1 | 8/2004 | Alcorn et al. |
| 2004/0153509 | A1 | 8/2004 | Alcorn et al. |
| 2004/0242973 | A1 | 12/2004 | Tanabe |
| 2004/0243568 | A1 | 12/2004 | Wang |
| 2006/0041555 | A1 | 2/2006 | Blessin et al. |
| 2006/0216683 | A1 | 9/2006 | Goradia |
| 2007/0087313 | A1 | 4/2007 | Vest |
| 2007/0132860 | A1 | 6/2007 | Prabhu et al. |
| 2008/0148150 | A1 | 6/2008 | Mall |
| 2008/0183520 | A1 | 7/2008 | Cutts |
| 2008/0195378 | A1 | 8/2008 | Nakazawa et al. |
| 2008/0235199 | A1* | 9/2008 | Li .......................... G06F 16/243 |
| 2008/0294637 | A1 | 11/2008 | Liu |
| 2009/0037398 | A1 | 2/2009 | Horvitz et al. |
| 2009/0241031 | A1 | 9/2009 | Gamaley |
| 2009/0287678 | A1 | 11/2009 | Brown et al. |
| 2009/0292687 | A1 | 11/2009 | Fan et al. |
| 2010/0153151 | A1 | 6/2010 | Toenjes |
| 2010/0299139 | A1 | 11/2010 | Ferrucci et al. |
| 2011/0066587 | A1 | 3/2011 | Ferrucci et al. |
| 2011/0125734 | A1 | 5/2011 | Duboue et al. |
| 2011/0179024 | A1 | 7/2011 | Stiver |
| 2011/0246910 | A1 | 10/2011 | Moxley |
| 2011/0295590 | A1 | 12/2011 | Lloyd et al. |
| 2012/0077178 | A1 | 3/2012 | Bagchi et al. |
| 2012/0078837 | A1 | 3/2012 | Bagchi et al. |
| 2012/0078889 | A1 | 3/2012 | Chu-Carroll |
| 2012/0078890 | A1 | 3/2012 | Fan et al. |
| 2012/0084293 | A1 | 4/2012 | Brown |
| 2012/0136649 | A1* | 5/2012 | Freising .............. G06F 16/3334 704/9 |
| 2012/0323906 | A1 | 12/2012 | Fan et al. |
| 2013/0007055 | A1 | 1/2013 | Brown et al. |
| 2013/0017523 | A1 | 1/2013 | Barborak et al. |
| 2013/0018652 | A1 | 1/2013 | Ferrucci et al. |
| 2013/0018876 | A1 | 1/2013 | Chu-Carroll |
| 2013/0031476 | A1 | 1/2013 | Coin et al. |
| 2013/0059283 | A1 | 3/2013 | Nagaoka et al. |
| 2013/0066886 | A1 | 3/2013 | Bagchi et al. |
| 2013/0124523 | A1* | 5/2013 | Rogers .................... G06F 19/32 707/737 |
| 2013/0151347 | A1 | 6/2013 | Baldwin |
| 2013/0157245 | A1 | 6/2013 | Basu et al. |
| 2013/0262501 | A1 | 10/2013 | Kuchmann-Beauger et al. |
| 2013/0268260 | A1* | 10/2013 | Lundberg ................ G06F 17/28 704/8 |
| 2013/0282698 | A1 | 10/2013 | Oztekin et al. |
| 2014/0006012 | A1 | 1/2014 | Zhou et al. |
| 2014/0046694 | A1 | 2/2014 | White |
| 2014/0058986 | A1 | 2/2014 | Boss et al. |
| 2014/0090081 | A1 | 3/2014 | Mattsson et al. |
| 2014/0189829 | A1 | 7/2014 | McLachlan et al. |
| 2014/0220540 | A1 | 8/2014 | Burgin et al. |
| 2014/0244565 | A1 | 8/2014 | de Konig |
| 2014/0250145 | A1 | 9/2014 | Jones et al. |
| 2014/0278363 | A1 | 9/2014 | Allen et al. |
| 2014/0280292 | A1* | 9/2014 | Skinder ............. G06F 16/24534 707/767 |
| 2014/0298199 | A1 | 10/2014 | Johnson, Jr. et al. |
| 2014/0316768 | A1 | 10/2014 | Khandekar |
| 2015/0347900 | A1 | 12/2015 | Bell et al. |
| 2015/0356579 | A1 | 12/2015 | Brondstetter et al. |
| 2016/0132605 | A1* | 5/2016 | Jiang ...................... H04L 67/16 707/728 |
| 2016/0148612 | A1* | 5/2016 | Guo ........................ G10L 15/22 704/257 |
| 2016/0171062 | A1 | 6/2016 | Bufe et al. |
| 2016/0171119 | A1 | 6/2016 | Bufe et al. |
| 2016/0196313 | A1 | 7/2016 | Allen et al. |
| 2016/0196336 | A1 | 7/2016 | Allen et al. |
| 2016/0203002 | A1 | 7/2016 | Kannan et al. |
| 2017/0124183 | A1 | 5/2017 | Braham et al. |
| 2018/0121508 | A1* | 5/2018 | Halstvedt ............ G06F 16/3344 |

FOREIGN PATENT DOCUMENTS

| | | |
|---|---|---|
| CN | 103221952 A | 7/2013 |
| CN | 103229120 A | 7/2013 |
| EP | 1705554 A2 | 9/2006 |
| JP | 4924950 B2 | 4/2012 |
| WO | 2012/040350 A1 | 3/2012 |
| WO | 2012/047532 A1 | 4/2012 |

OTHER PUBLICATIONS

Ruotsalo et al., "Interactive Intent Modeling: Information Discovery Beyond Search", CACM vol. 58, No. 1, Jan. 2015, 7 pages.

Sigdial 2014, Proceedings of the Sigdial 2014 Conference, 15th Annual Meeting of the Special Interest Group on Discourse and Dialogue, the Association for Computational Linguistics, ISBN 978-1-941643-21-1, 2014, 358 pages.

Gangadharaiah et al., "Natural Language Query Refinement for Problem Resolution from Crowd-Sourced Semi-Structured Data", International Joint Conference on Natural Language Processing, Oct. 2013, pp. 243-251.

B. Peintner et al., Preferences in Interactive Systems: Technical Challenges and Case Studies, Association for the Advancement of Artificial Intelligence, AI Magazine, Winter 2008, 12 pages.

W. Zadrozny et al., Natural language dialogue for personalized interaction, Communications of the ACM 43.8 (2000): 116-120.

R. High, "The Era of Cognitive Systems: An Inside Look at IBM Watson and How it Works," IBM Corporation, Redbooks, Dec. 12, 2012, 16 pages.

Yuan et al., "Watson and Healthcare, How natural language processing and semantic search could revolutionize clinical decision support", IBM developerWorks, IBM Corporation, Apr. 12, 2011, 14 pages.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

S. Quarteroni, Personalized Question Answering, TAL. vol. 51, Jan. 2010, pp. 97-123.

U.S. Appl. No. 14/228,830.

Lin, Jimmy et al., "The Role of Context in Question Answering Systems", CHI 2003, http://groups.csail.mit.edu/infolab/publications/Lin-etal-CHI03.pdf, Apr. 5-10, 2003, 2 pages.

Quarteroni, Silvia et al., "User Modelling for Adaptive Question Answering and Information Retrieval", American Association for Artificial Intelligence, http://www.aaai.org/Papers/FLAIRS/2006/Flairs06-153.pdf, 2006, pp. 776-781.

(56) References Cited

OTHER PUBLICATIONS

International Search Report and Written Opinion dated Apr. 1, 2014 for International Application No. PCT/IB2014/058498, 7 pages.
"Question Answering", Wikipedia, accessed on Nov. 21, 2014, 9 pages.
Dong, Tiansi et al., "A Natural Language Question Answering System as a Participant in Human q&a Portals", Proceedings of the Twenty-Second International Joint Conference on Artificial Intelligence, Jul. 16-22, 2011, pp. 2430-2435.
McCord, M.C. et al., "Deep parsing in Watson", IBM J. Res. & Dev. vol. 56 No. 3/4 Paper 3, May/Jul. 2012, pp. 3:1-3:15.
Popkin, Jamie, "Google, Apple Siri and IBM Watson: The Future of Natural-Language Question Answering in Your Enterprise", Gartner.com, https://www.gartner.com/doc/2534823/google-apple-siri-ibm-watson, Jun. 28, 2013, 2 pages.
Srihari, Rohini et al., "A Question Answering System Supported by Information Extraction", ANLC '00 Proceedings of the sixth conference on Applied natural language processing, http://www.aclweb.org/anthology/A00-1023.pdf, Apr. 29, 2000, pp. 166-172.
List of IBM Patents or Patent Applications Treated as Related, Aug. 2017, 2 pages.

\* cited by examiner

| TYPE | FACTOR |
|---|---|
| QUANTITATIVE CONCEPT TEMPORAL CONCEPT AGE GROUP | 30-YEAR-OLD |
| POPULATION GROUP PATIENT OR DISABLED GROUP HUMAN | WOMAN |
| FINDING SIGN OR SYMPTOM | FEVER |
| FINDING SIGN OR SYMPTOM | MUSCLE PAIN |
| FINDING SIGN OR SYMPTOM | HEADACHES THAT STARTED SEVERAL DAYS AGO |
| TEMPORAL CONCEPT TEMPORAL CONCEPTS | WITHIN THE LAST DAY |
| SIGN OR SYMPTOM | GENERALIZED WEAKNESS |
| FINDING SIGN OR SYMPTOM | BACK PAIN |
| FINDING SIGN OR SYMPTOM | DIZZINESS |
| ORGANIC CHEMICAL PHARMACOLOGIC SUBSTANCE | ACETAMINOPHEN |
| NEOPLASTIC PROCESS FINDING | FEARS HER SYMPTOMS MAY BE CANCER |
| PROFESSIONAL OR OCCUPATIONAL GROUP DIAGNOSTIC PROCEDURE | DOCTORS |
| FINDING TEMPORAL CONCEPT | DETECT |
| ANATOMICAL ABNORMALITY | LIVER ABNORMALITIES |
| LABORATORY PROCEDURE | BLOOD PROTEIN TESTING |
| FINDING | ELEVATED IMMUNOGLOBULINS |

| TYPE | FACTOR |
|---|---|
| LABORATORY PROCEDURE | BLOOD TESTS |
| QUALITATIVE CONCEPT FUNCTIONAL CONCEPT | NEGATIVE |
| NEOPLASTIC PROCESS FINDING | CANCER |
| PROFESSIONAL GROUP | INFECTIOUS DISEASE SPECIALIST |
| DISEASE OR SYNDROME | ARBOVIRUS INFECTION |
| DISEASE OR SYNDROME | RVF |

FIG.3A

| TYPE | FACTOR |
|---|---|
| QUANTITATIVE CONCEPT | |
| TEMPORAL CONCEPT | |
| AGE GROUP | 30-YEAR-OLD |
| POPULATION GROUP | |
| PATIENT OR DISABLED GROUP | WOMAN |
| HUMAN | |
| FINDING | |
| SIGN OR SYMPTOM | FEVER |
| FINDING | |
| SIGN OR SYMPTOM | MUSCLE PAIN |
| FINDING | |
| SIGN OR SYMPTOM | HEADACHES THAT STARTED SEVERAL DAYS AGO |
| TEMPORAL CONCEPT | |
| TEMPORAL CONCEPTS | WITHIN THE LAST DAY |
| SIGN OR SYMPTOM | GENERALIZED WEAKNESS |
| FINDING | |
| SIGN OR SYMPTOM | BACK PAIN |
| FINDING | |
| SIGN OR SYMPTOM | DIZZINESS |
| ORGANIC CHEMICAL | |
| PHARMACOLOGIC SUBSTANCE | ACETAMINOPHEN |
| NEOPLASTIC PROCESS | FEARS HER SYMPTOMS MAY BE CANCER |
| FINDING | |
| PROFESSIONAL OR OCCUPATIONAL GROUP | DOCTORS |
| DIAGNOSTIC PROCEDURE | |
| FINDING | DETECT |
| TEMPORAL CONCEPT | |
| ANATOMICAL ABNORMALITY | LIVER ABNORMALITIES |
| LABORATORY PROCEDURE | BLOOD PROTEIN TESTING |
| FINDING | ELEVATED IMMUNOGLOBULINS |

| TYPE | FACTOR |
|---|---|
| LABORATORY PROCEDURE | BLOOD TESTS |
| QUALITATIVE CONCEPT | |
| FUNCTIONAL CONCEPT | NEGATIVE |
| NEOPLASTIC PROCESS | CANCER |
| FINDING | |
| PROFESSIONAL GROUP | INFECTIOUS DISEASE SPECIALIST |
| DISEASE OR SYNDROME | ARBOVIRUS INFECTION |
| DISEASE OR SYNDROME | RVF |

FIG.3B

| CANCERS | ANEMIAS | BLOOD-MISC |
|---|---|---|
| - CANCER GENETICS AND CYTOGENETICS::MOLECULAR CYTOGENETIC STUDIES, ACUTE LYMPHOBLASTIC LEUKEMIA | - APPROACH TO THE ANEMIAS | - BLOOD TRANSFUSION: INDICATIONS, ADMINISTRATION AND ADVERSE REACTIONS |
| - HEMATOLOGY/ONCOLOGY AND STEM CELL THERAPY::SKIN IN A HODGKIN LYMPHOMA | - THE AUTOIMMUNE HEMOLYTIC ANEMIAS: CLINICAL HEMATOLOGY | - POLYCHROMASIA |
| - LYMPHOMA (HODGKIN'S) | | |
| - LEUKEMIA RESEARCH REPORTS::INTRAVASCULAR LARGE B CELL LYMPHOMA | | |
| - LIST OF HEMATOLOGIC CONDITIONS | | |

FIG.4

| MICROBIAL | - DENGUE AND HEMORRHAGIC FEVER VIRUSES::CLINICAL HEMATOLOGY |
| | - RIFT VALLEY FEVER |
| | - ARBOVIRUSES AFFECTING THE CENTRAL NERVOUS SYSTEM |
| | - MARBURG HEMORRAGHIC FEVER |
| | - DISORDERS DUE TO HEAT AND COLD |
| | - PICORNAVIRUSES::MEDICAL MICROBIOLOGY |
| | - BACTERIAL, PARASITIC, AND FUNGAL INFECTIONS OF THE LIVER, INCLUDING LIVER ABSCESS::SLEISENGER AND FORDTRAN'S GASTROINTESTINAL AND LIVER DISEASE |
| SYSTEMIC | - SARCOIDOSIS |
| | - SJÖGREN'S SYNDROME |
| | - HEAT-RELATED ILLNESSES |

FIG.5

- RIFT VALLEY FEVER
- DENGUE AND HEMORRHAGIC FEVER VIRUSES
- VIRAL HEMORRHAGIC FEVER
- INFECTIONS IN RETURNING TRAVELERS
- ARBOVIRUS
- TOGAVIRUSES AND FLAVIVIRUSES: MEDICAL MICROBIOLOGY
- NERVOUS SYSTEM COMPLICATIONS OF SYSTEMIC VIRAL INFECTIONS
- ARBOVIRUS ENCEPHALITIS

| RIFT VALLEY FEVER | ARBOVIRUSES-MISC |

FIG.6

PROCESSING CONTEXT-BASED INQUIRIES FOR KNOWLEDGE RETRIEVAL

BACKGROUND

1. Technical Field

Present invention embodiments relate to knowledge retrieval systems, and more specifically, to interactively processing context-based user inquiries to refine knowledge retrieval and produce answers to inquiries.

2. Discussion of the Related Art

Existing applications of question answering (QA) systems to support decision making assume that the decision problem can be directly formulated into a question and that the answer can directly influence the decision to be made. However, these assumptions may not hold for complex domains (e.g., healthcare) in which the problem state may be complex and not easily convertible into a question. In addition, QA systems generally do not provide information regarding the interpretation of the question by the QA system. Without this information, the user, who has expertise in these complex domains, cannot provide feedback and correction to the interpretation and is left to guess how/why the QA system generated a particular answer to a posed question. This can lead to an inefficient trial-and-error approach with the user rephrasing the question in hope of inducing the desired interpretation. Existing QA systems are also unable to adapt and learn from interactions with the user because these systems are generally trained prior to deployment using sets of questions and corresponding answers (e.g., ground truth).

SUMMARY

According to one embodiment of the present invention, provided is a system for processing an inquiry to provide results satisfying the inquiry. The system includes a computer system having at least one processor. The processor is configured to process an inquiry using natural language processing to determine an interpretation for the inquiry and present the interpretation to receive corrective information for the interpretation. The processor is further configured to apply the corrective information to the interpretation and retrieve content based on the interpretation and a corresponding pre-existing context for the inquiry to produce candidate results for the inquiry. The processor iteratively receives supplemental information for the inquiry to generate updated candidate results.

BRIEF DESCRIPTION OF THE DRAWINGS

Generally, like reference numerals in the various figures are utilized to designate like components.

FIGS. 3A and 3B are information charts illustrating example context analysis according to an embodiment of the present invention.

FIG. 4 is an information listing illustrating example answers according to an embodiment of the present invention.

FIG. 5 is another information listing illustrating example answers based on updated context according to an embodiment of the present invention.

FIG. 6 is yet another information listing illustrating example answers based on a supplemental question according to an embodiment of the present invention

DETAILED DESCRIPTION

Figure 1:
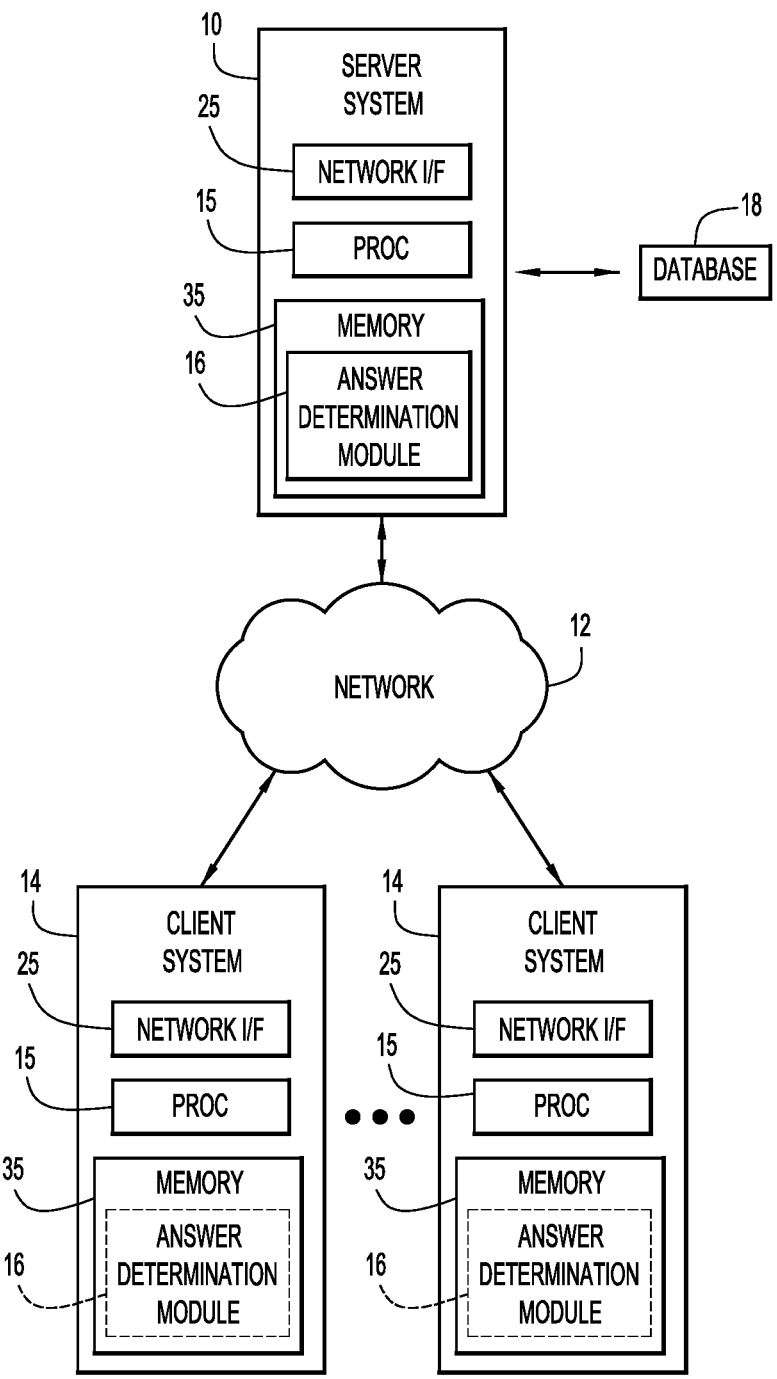
FIG. 1 is a diagrammatic illustration of an example computing environment for use with an embodiment of the present invention.

Present invention embodiments relate to processing an inquiry to provide results satisfying the inquiry. An inquiry (e.g., a medical question) is processed using natural language processing to determine an interpretation for the inquiry. The interpretation may indicate that the system interpreted a word as some relevant information (e.g., a specific type of symptom). The interpretation is presented to receive corrective information for the interpretation. A user may input the corrective information in response to, for example, an incorrect interpretation. The corrective information is applied to the interpretation (e.g., the incorrect interpretation may be corrected based on the user input). Content may be retrieved based on the interpretation and a corresponding pre-existing context for the inquiry to produce candidate results for the inquiry. The corresponding pre-existing context may be, for example, a narrative description input by a user. Supplemental information for the inquiry (e.g., provided by the user) may be iteratively received to generate updated candidate results. The candidate results may be in the form of, for example, excerpts of potentially relevant passages stored in knowledge repositories.

Decision making processes often exist in a complex problem space with an elaborate background context. There is often no single, specific query or target solution. Decision making processes may require a series of questions that are influenced by the answers to previous questions. In addition, the answer to a question need not directly align with the information required to make a decision. As such, provided herein is an interactive platform for collaboration between a user (e.g., a human decision maker) and a question answering (QA) system. The QA system is enabled to expose to the user its interpretation, thereby permitting the user to interact with the QA system in a productive manner. Further, data obtained from the system interactions with the user is analyzed to perform real-time adaptation and learning.

This QA-based exploratory information gathering system takes into consideration arbitrary context surrounding a user query/question. The context provides background information that may be used to bias question answering behavior to provide information crucial to the decision-making process. The system may behave transparently, exposing elements of its interpretation to clarify its behavior. Based on these exposed interpretations, the user may be permitted to intervene and guide the system to correct its interpretations and/or otherwise guide the system. This process may be iterative. For example, to acquire all the desired information, the user may provide context, ask a question, analyze the results, provide more context, ask more questions, etc. The system may also adapt to user feedback, thereby improving its interpretations of user input and its answers to user questions.

Provided herein are mechanisms for a user (e.g., a human decision maker) to specify a problem state and to interact with a QA system through a series of statements, questions, and/or interventions. The problem state may be referred to herein as a "context" that represents known facts about a problem/situation. Context may have a structure with a schema defined for a problem class or decision domain. The context may be directly imported from another application or a database, and/or may be interactively built up from user statements. Questions sent to the QA system may directly or indirectly refer to elements of this context. Answers returned by the QA system may be ranked by importance according to the context.

The system may also interact with the user with regard to the context. These interactions may be passive or active. Passive interactions may involve exposing certain key aspects of the QA system interpretation of the natural language statements/questions. Active interaction may involve the system seeking clarification or asking for missing information to complete certain context information, as defined by its schema.

These interactions may provide data from which the system may adapt to and learn from the user. The system may adapt to extracting context information from statements and answering questions. Adaptation and learning may be rule-based, in which the system may learn a rule after just a few interactions. More robust statistical learning techniques may also be used as more interaction data becomes available.

The QA system described herein may include one or more of the following features: context, transparency, intervention/guidance, iteration, and adaptation. Context may provide background information to be used to bias question answering behavior. Transparency may cause certain elements of interpretation to be exposed to the user to make clear the reason(s) for particular system behavior. This transparency may enable the decision maker to intervene/guide system interpretations, or otherwise guide the system. The iterative feature may correspond to a user ability to repeat a cycle of question-asking, for example with different variables (e.g., providing additional context after a question is answered, asking further questions, etc.). The system may also adapt to user behavior, thereby improving both system interpretations of user input and system answers to user questions. Each of these five features is described in greater detail below.

Context

Oftentimes, complex information needs for decision support cannot be formulated as a single, simple question. For example, question answering behavior may need to take into consideration potentially lengthy and elaborate context. Thus, in the medical domain, questions are often asked in the context of a particular patient. The interpretation of the question and the selection of appropriate answer content may depend on background knowledge and medical history of the patient. In the aircraft engine troubleshooting domain, question answering may depend on output data from sensors and on textual descriptions of observed equipment behavior.

As described herein, an arbitrary context may be specified during a question answering session. The context may be specified as natural language utterances which may be interpreted via natural language processing (NLP) to link phrases to known concepts, detect relations, resolve co-reference, etc. The context may also be structured, user-input data according to a known schema or imported from existing databases, knowledge bases, or other applications.

If the user subsequently asks a question or submits an information need request, the QA system may include in the search the context and/or reasoning required to answer the question. Potential answers that are most relevant to the question and the context may be considered the best candidates. Prior questions, prior answers, and/or record(s) of user behavior may be considered context for subsequent questions.

For example, the cognitive system may receive an information need request that is not necessarily expressed as a question (e.g., "tell me treatments for this patient") and a corresponding initial context (e.g., a description of the patient such as "face green, female, recently on trip to South America"). The system may then process the request and determine whether a response to the request may be generated with sufficient confidence. If not, follow-up/subsequent/further questions may be posed to the user requesting additional context information. The earlier-posed questions may be used to generate a new contextual basis for processing the request. This may be accomplished in an iterative manner until one or more responses to the request are generated that have a sufficient confidence score. The response(s) to the request is not necessarily a single focused answer, but instead may involve multiple answers depending on the context.

Transparency

The QA system described herein may expose elements of its interpretation (e.g., before answering the question) to allow the user to confirm that the interpretation is correct. If the interpretation(s) are incorrect, the user may supply specific new input to correct the interpretation(s). Examples of exposed interpretation include linking from user phrases to known concepts, detection of relations among phrases or concepts, resolution of co-referent expressions, and matching input expressions to fill known schemas.

The QA system described herein may also expose a representation of the actions to be taken to satisfy/answer the information request. For example, when question answering involves information retrieval over a corpus, the system may expose a representation of the search query to be issued. The user may thus understand whether/how the results of question and/or context analysis are used to formulate the query. When question answering involves database or knowledge base lookup, the system may expose a representation of the formal query specific to the structured resources. This may allow confirmation that the planned behavior is appropriate (in the case of a correct query/interpretation/etc.) or may explain why answers may be inappropriate (in the case of a flawed query/interpretation/etc.).

An answer determination module may provide a user interface through which the user may indicate whether a given analysis result was correct or not and if not, what the proper analysis result should have been and/or a selection of an evidence passage that supports the proper analysis result. This information may then be used to adjust the scoring performed by the analysis result reporting module. The analysis reporting module(s) are associated with internal logic elements of the cognitive system pipeline and maintain information about the way in which the particular internal logic element processed the request and/or corpus of evidence passages.

For example, a user may input context indicating that "the patient is dizzy." In this example, the user intends for the (e.g., cognitive) QA system to interpret this context as a symptom, but instead the system interprets this context as an indication that the patient is a jazz trumpeter (i.e., Dizzy Gillespie). Thus, the analysis reporting module may maintain information indicating that a corresponding annotator logic element analyzed the request and highly scored the term "dizzy" in the context of "the patient is" as referencing a name of the patient. The analysis reporting module may also indicate which corresponding passages from a corpus scored highly as a result.

In another example, context information indicates that the patient has "swollen arms and legs". The answer determination module may parse this information and determine that the patient has "swollen arms" and also has "legs". The analysis reporting module may make available to the user the result of this parsing. The user may correct this parsing by indicating that the patient has "swollen arms" and "swollen legs." This user feedback may be used to modify the way in which the annotator logic element parses similar phrases in the future. As such, the analysis reporting modules may provide information for the user to focus modifications of the operation of the cognitive system to obtain more correct results.

Intervention/Guidance

In addition to exposing elements of system interpretation, the user may also change that interpretation. For example, if it is clear that the system has made an error and the user knows what the correct interpretation should be, the user may directly supply the correct interpretation.

There are at least two options for a user to correct system interpretations: direct intervention and indirect guidance. For direct intervention, the user directly manipulates the exposed interpretation. For example, if the system links a phrase to an incorrect concept, the user may edit the exposed concept to supply the correct one. If the system resolves a referring expression from the user input to the incorrect referent, the user may directly change the reference to point to the correct referent.

For indirect guidance, the user supplies new information that guides the system to redo a previous interpretation. For example, if the system committed an attachment error on the phrase "recurring chest pain" (e.g., by attaching "recurring" to "chest" instead of to "pain"), the user may guide the system to reinterpret correctly (e.g., by specifying "the pain is recurring, not the chest"). Similarly, if the system consistently misinterprets the meaning of a phrase, the user may guide the system to change its behavior by explicitly stating the meaning (e.g., "by MI I mean myocardial infarction").

Iteration

Decision making in complex domains often requires more than an answer to a single question. The QA system allows the user to supply context, ask a question, digest candidate answers to the question, supply further context, propose hypotheses, ask follow-on questions, and so on in an iterative manner. Subsequent questions in this iterative scenario may not be independent. Instead, they may build on previous context, questions and answers. The user may read the answers and think of hypotheses that the system should consider in future iterations. The system may aggregate all of the knowledge and hypotheses supplied by/to the user during a session. The system may take this knowledge into consideration when answering follow-on questions.

Adaptation

The QA system may also adapt its behavior to user input. This adaptation may occur at one or more of the following levels: offline learning, online learning, active learning, direct guidance, and inter-user adaptation. For offline learning, system models (e.g., end-to-end question answering models, models for component technologies within the question answering pipeline, etc.) may be retrained as training data is gathered (e.g., through use of the system, explicit data annotation exercises, etc.). For online learning, each user intervention may be treated as new training data to adapt models online as the user intervenes. For example, when the user corrects a relation type assignment (e.g., changing (xRy) to (xSy), where x is a first variable/concept/character string/etc., y is a second variable/concept/character string/etc., xRy denotes an incorrect system-generated relation between x and y, and xSy denotes the user-supplied correct relation between x and y), the relation detector may assume both a new negative training example (e.g., xRy is an unlikely relation in certain contexts) and a new positive training example (e.g., xSy is a likely relation in certain contexts). User intervention/guidance of question results (as correct or incorrect) may be used as training examples to adapt search/answer generation, ranking models, etc.

The system may also engage in active learning, in which the system detects, based on user interventions, which examples/features cause the poorest system performance. The system may use active learning to engage the user in a dialog to help interpret known difficult examples. With respect to direct guidance, the user may supply new rules to change the future behavior of the system and/or its components. This may be a complement to the learned statistical models. With respect to inter-user adaptation, the system may identify common attributes among user behavior (e.g., interventions) within a user group or domain to adapt/generate group- or domain-specific models based on the common attributes.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 enable users to provide an inquiry (e.g., relating to diagnosing a patient with an illness/disease, etc.) to server systems 10 to process the inquiry to provide results satisfying the inquiry. The server systems include an answer determination module 16 to process the inquiry and provide results satisfying the inquiry. A database system 18 may store various information for the analysis (e.g., illness/disease information, etc.). The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to enable a user to submit an inquiry to and receive results from the answer determination module 16.

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, answer determination module 16, browser/interface software, etc.).

Alternatively, one or more client systems 14 may process an inquiry to provide results satisfying the inquiry when operating as a stand-alone unit. In a stand-alone mode of operation, the client system stores or has access to the data (e.g., database 18), and includes answer determination module 16 to process the inquiry to provide results satisfying the inquiry. The graphical user (e.g., GUI, etc.) or other interface (e.g., command line prompts, menu screens, etc.) solicits information from a corresponding user pertaining to the inquiry, corrective/supplemental information, etc. and provides the results.

Answer determination module 16 may include one or more modules (e.g., analysis reporting module, annotator logic element, etc.) or units to perform the various functions of present invention embodiments described below. The various modules (e.g., answer determination module 16) may be implemented by any combination of any quantity of software and/or hardware modules or units, and may reside within memory 35 of the server and/or client systems for execution by processor 15.

Figure 2:
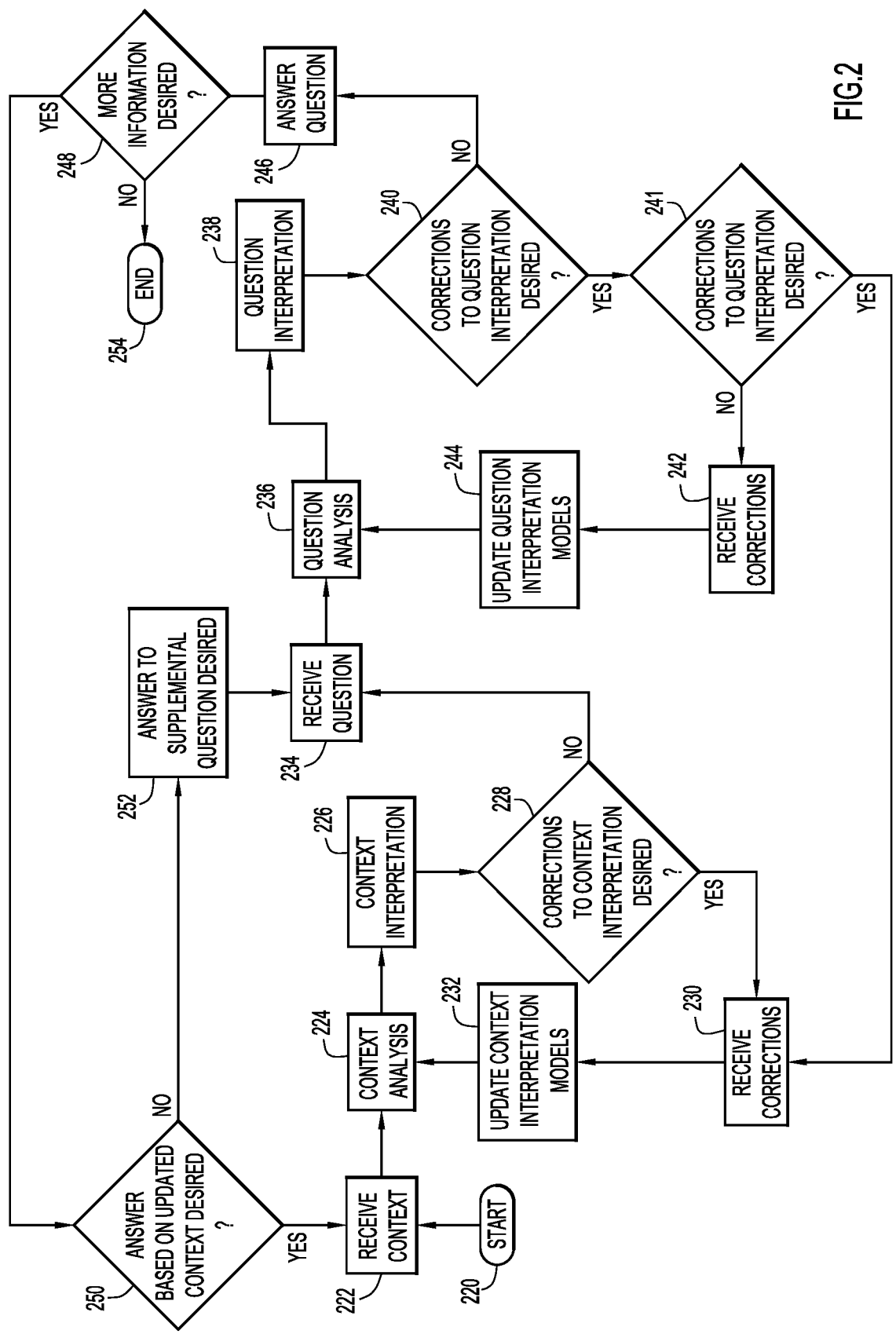
FIG. 2 is a flow diagram illustrating an example manner of interactively processing context-based user inquiries according to an embodiment of the present invention.

FIG. 2 is a flow diagram illustrating an example manner of interactively processing context-based user inquiries according to an embodiment of the present invention. As described herein, this example manner permits the user to make corrections to the system interpretation of the user-provided context and/or questions. The example manner of FIG. 2 will be described herein with reference to FIGS. 3A-6.

The flow of FIG. 2 begins at the "Start" block 220. At block 222, the system receives context (e.g., background information for a question to be posed). The context may be manually typed, in a chat-based interface, and/or imported from a database (e.g., a medical database), etc. Example context for a medical question is provided as follows:
A 30-year-old woman presents with fever, muscle pain and headaches that started several days ago. Within the last day, she reports onset of generalized weakness, back pain and dizziness. She has been taking acetaminophen for the pain and fever, but fears her symptoms may be cancer. On examination, doctors detect signs of liver abnormalities and order blood protein testing to check for elevated immunoglobulins.

At block 224, the system analyzes the context (e.g., via NLP) in order to produce an interpretation of the context at block 226. Interpreting the context may involve parsing, entity detection, relation detection, etc. For example, FIG. 3A is an information chart illustrating an example NLP-based analysis of the medical context provided above. Each "factor" is a portion/phrase/word taken from the example context, and each "type" is a corresponding description of the system interpretation or possible system interpretations. For example, the factor "signs of liver abnormalities" corresponds to the type "Anatomical Abnormality". As such, the system has interpreted the phrase "signs of liver abnormalities" as an indication of an anatomical abnormality (e.g., liver abnormality). Meanwhile, the factor "30-year-old" corresponds to three different types: quantitative concept, temporal concept, and age group. As such, in this example, NLP yields an ambiguous interpretation of the phrase "30-year-old."

Turning now back to FIG. 2, at block 228, it is determined (e.g., by the user) whether corrections to the system context interpretation are desired. In the example of FIG. 3A, such correction is desired (i.e., "yes" at block 228) because the system interpreted certain factors (e.g., "30-year-old") ambiguously. As such, in this example, the flow proceeds to block 230, where the system receives corrections to its interpretation. FIG. 3B is an information chart illustrating user-corrected interpretations of the context. For example, the user has indicated that "30-year-old" corresponds to an age group, and not to other quantitative or temporal concepts. The user has also permitted multiple interpretations for certain factors (e.g., "headaches that started several days ago" may indicate a finding or a sign or symptom). In addition, the user may indicate that certain factors are irrelevant to the question to be posed (e.g., "fears her symptoms may be cancer"). Thus, in contrast to "black-box" QA systems, the user may correct system interpretations of user-provided context.

In general, the system may present context interpretation in any suitable arrangement. For example, certain factors from FIGS. 3A and 3B may be highlighted to indicate that they may be more relevant/important than the non-highlighted factors. The system may allow the user to edit items directly to correct interpretations. In addition, each factor and/or type may have an adjacent checkbox to enable the user to delete the system interpretation (e.g., by selecting/deselecting certain checkboxes).

Returning now to FIG. 2, the flow proceeds to block 232, where the system (e.g., the answer determination module 16 of FIG. 1) updates a context interpretation model. The model may originally be based on an initial NLP model, and may update/adapt (e.g., at block 232) based on the user corrections to the system interpretation of the context. The context interpretation model may be mathematical, rule-based, statistical, etc. For example, a statistical model may indicate which concept is associated with a parsed phrase (e.g., "back pain" has a high probability of referring to the concept "dorsalgia," etc.). Based on the updated context model, the system may perform context analysis and interpretation at blocks 224 and 226, respectively. The flows in block 224-232 may repeat in a loop until the user is satisfied that the context interpretation is correct.

When no further corrections to the context interpretation are desired (i.e., "no" at block 228), the flow proceeds to block 234. At block 234, the system receives a question. The user may, for example, manually type the question in natural language. For the example context provided above, the question may be "What could it be?," "Could it be cancer?," etc. Thus, the question(s) in this example inquires as to the medical diagnosis of the woman. Such questions may be generic (though not necessarily underspecified) to allow the system to perform a context-sensitive, hypothesis-biased exploration of content (e.g., database 18 in FIG. 1).

At block 236, the system analyzes the question (e.g., via NLP) in order to produce an interpretation of the question at block 238. Like the context, interpreting the question may involve parsing, entity detection, relation detection, etc. At block 240, it is determined (e.g., by the user) whether corrections to the system question interpretation are desired. If there are (i.e., "yes" at block 240), the flow proceeds to block 241. If the user discovers at block 241 that the system failed to correctly interpret the question because of its incorrect interpretation of the context, the user may "go back" to correct the context interpretation at block 230. If the user instead wishes to directly correct the question interpretation (i.e., "no" at block 241), the flow proceeds to block 242, where the system receives corrections to its interpretation of the user question. Thus, in contrast to "black-box" QA systems, the user may correct system interpretations of user-provided question.

The flow proceeds to block 244, where the system (e.g., the answer determination module 16 of FIG. 1) updates a question interpretation model. Like the context interpretation model, the question interpretation model may originally be based on initial NLP models, may update/adapt (e.g., at block 244) based on the user corrections to the system interpretation of the question, and may be mathematical, rule-based, statistical, etc. Based on these (possibly updated) models, the system may perform question analysis and interpretation at blocks 236 and 238, respectively. The flow in blocks 236-244 may repeat in a loop until the user is satisfied that the question interpretation is correct. In addition, the user may return to the loop of blocks 224-232 (e.g., by proceeding from block 241 to block 230) to provide further corrections to the context interpretation.

When no further corrections to the question (or context) interpretations are desired (i.e., "no" at block 240), the flow proceeds to block 246. At block 246, the system provides the user with an answer to the question. FIG. 4 illustrates an example information listing of possible documents containing answers/candidate results to the question "What could it be?" The answers are passages in documents that are relevant to the question. For this particular question, three categories of links to information may be provided: cancers, anemias, and blood—misc. Each category includes a number of potentially relevant information sources. For example, the cancers category includes a link to information regarding lymphoma (Hodgkin's), a list of hematologic conditions, etc. The anemias category include information regarding an approach to the anemias and autoimmune hemolytic anemias. The blood—misc category includes information regarding blood transfusions and polychromasia. The links under each category may link to information/passages from a single corpus/collection or from a variety of sources. As such, a user may research a particular topic by selecting a link.

The context may help determine which categories, which links within the categories, and what information/passages to produce in response to the user question. For example, factors such as "cancer," "liver abnormalities," "fever," and "headaches" may have contributed to the determination of the cancers category. Similarly, factors such as "fever," "dizziness," "weakness," and "back pain" may have contributed to the determination of the anemias category. Factors such as "weakness" and "dizziness" may have contributed to the determination of the blood—misc category.

In an invention embodiment, the system may provide excerpt(s) from the linked passages. In an example, the respective excerpts may be provided under the respective links. These excerpts and/or portions thereof may include an indication of the factors that caused the system to provide the links. For example, the autoimmune hemolytic anemias link excerpt(s) may highlight phrases such as "myalgia" because the context included the phrase "muscle pain". As illustrated in FIG. 4, the system may provide dynamic clustering and indications of the distribution of context information in clusters/categories.

Turning now back to FIG. 2, at block 248 it is determined (e.g., by the user) whether more information is desired in addition to the information provided by the question answer. For example, the answer may not have fully answered the question, or answered the question incorrectly. In this case, the flow proceeds to block 250 (i.e., via "yes" at block 248), where it is determined whether updated context is desired. If it is determined that update context is desired (i.e., "yes" at block 250), the flow proceeds to block 222, where the system receives the updated context. For example, the user may provide further context regarding the woman as follows:

The blood tests came back negative, ruling out cancer. The woman was referred to an infectious disease specialist who thought it might be an arbovirus infection, possibly RVF.

When the flow again reaches block 246, system may produce new/different answers based on the updated context, as shown in FIG. 5. The example in FIG. 5 illustrates two new categories of links to information: microbial and systemic. The system no longer produces the cancer category, for example, because the updated context makes cancer seem unlikely (e.g., "ruling out cancer"). Updating the context permits the user to add/remove/etc. information in/from/etc. the existing context, and/or to explore alternate user hypotheses.

Returning now to FIG. 2, the user may not desire to update the context. In this example the user desires an answer to a supplemental question at block 252. For example, the user may input "May be an arbovirus infection" to further focus the results. In other words, the user-supplied hypothesis (e.g., that the woman is afflicted with an arbovirus infection) enables more specific answers and clustering. In this case, when the flow eventually returns to block 246, the system may produce the information shown in FIG. 6. This updated information provides two new categories of information specific to the user, specifically Rift Valley Fever and arboviruses—misc. The user may continue to pursue more information (i.e., "yes" at block 248) in a loop until the user is satisfied with the discovered information. At that point, the user may determine that no more information is desired (i.e., "no" at block 248), and the flow ends at block 254.

In other examples, the user may choose to "go back" to correct the context analysis and/or question analysis, and/or to ask a supplemental question, at any point in the flow. In addition, the answer(s), context interpretation, and/or question interpretation may be provided/displayed for the user in any suitable manner.

The techniques described herein address several known technical problems, including entity detection, entity linking, and word-sense disambiguation (WSD) in computer science. Entity detection refers to the task of using computers to determine which words or phrases in a text indicate concepts of interest. Entity linking refers to the task of using computers to determine which concepts in a structured knowledge source the detected words or phrases denote. WSD refers to the task of using computers to distinguish among alternative meanings of an ambiguous word (e.g., "30-year-old"). As described herein, a computer may learn (e.g., via machine learning) the correct meaning of certain ambiguous words based on the context of the word. For example, a computer may learn to distinguish between situations in which the phrase "30-year-old" refers, alternatively, to an age group, a temporal concept, or a quantitative concept. These techniques also improve the decision-making time involved to query a QA system, and as such reduce the time to produce an answer to the query. For instance, interpreting context and questions transparently and updating context/question interpretation models reduces the number of iterations necessary to arrive at a satisfactory answer.

It will be appreciated that the embodiments described above and illustrated in the drawings represent only a few of the many ways of implementing embodiments for processing an inquiry to provide results satisfying the inquiry.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, answer determination module 16, etc.). These systems may include any types of monitors and input devices (e.g., keyboard, mouse, voice recognition, etc.) to enter and/or view information.

It is to be understood that the software (e.g., answer determination module 16) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., answer determination module 16) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., information relating to diseases/illnesses). The database system may be implemented by any number of any conventional or other databases, data stores or storage structures (e.g., files, databases, data structures, data or other repositories, etc.) to store information (e.g., information relating to diseases/illnesses). The database system may be included within or coupled to the server and/or client systems. The database systems and/or storage structures may be remote from or local to the computer or other processing systems, and may store any desired data (e.g., information relating to diseases/illnesses).

The present invention embodiments may employ any number of any type of user interface (e.g., Graphical User Interface (GUI), command-line, prompt, etc.) for obtaining or providing information (e.g., information relating to diseases/illnesses), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for processing an inquiry to provide results satisfying the inquiry.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for processing an inquiry to provide results satisfying the inquiry, the computer program product comprising one or more computer readable storage media collectively having computer readable program code embodied therewith, the computer readable program code executable by a processor to cause the processor to:

process a context using natural language processing to determine an interpretation for the context, wherein the context includes a description of a scenario pertaining to the inquiry and the interpretation for the context includes results of the natural language processing from one or more of parsing, entity detection, and relation detection of the context, and wherein the results of the natural language processing of the context include one or more factors each comprising a context portion including text extracted from the description of the scenario, and a type determined by the natural language processing for each factor comprising a description of the interpretation for the context portion corresponding to the factor;

process the inquiry using natural language processing to determine an interpretation for the inquiry based on the interpretation for the context;

present the interpretation for the inquiry to a user;

in response to an incorrect interpretation for the inquiry:
receive corrective information for the interpretation for the context from the user, wherein the corrective information for the interpretation for the context includes modifications to the type, extracted text, and relevancy to the inquiry for one or more factors in the results of the natural language processing of the context;

apply the modifications of the corrective information to adjust the results of the natural language processing of the context and modify the interpretation for the context; and process the inquiry utilizing natural language processing with the modified interpretation for the context to adjust the interpretation for the inquiry;

retrieve content based on the adjusted interpretation for the inquiry and the context to produce candidate results for the inquiry; and iteratively receive supplemental information for the inquiry to generate updated candidate results.

2. The computer program product of claim 1, wherein the inquiry requests medical information.

3. The computer program product of claim 1, wherein the context includes a structure with a schema defined for one of a problem class and a decision domain, wherein natural language utterances are processed to create the context aligned with the schema.

4. The computer program product of claim 1, wherein the processor presents the interpretation for the inquiry by:
presenting actions to be performed based on the interpretation for the inquiry to produce the candidate results and receiving modifications for the actions.

5. The computer program product of claim 1, wherein the supplemental information includes one or more from a group of: information pertaining to the context; user input adding, removing, or modifying the context to re-generate candidate results for a previous inquiry in light of altered context; hypotheses proposed by the user to focus the candidate results; and follow-up questions triggered from viewing the candidate results.

6. The computer program product of claim 1, wherein the computer readable program code further causes the processor to:
adapt processing to produce the candidate results based on processing of one or more prior inquiries.

7. The computer program product of claim 6, wherein the processor adapts processing to produce the candidate results by one or more from a group of:
collecting training information from the processing of the one or more prior inquiries and re-training models used to produce the candidate results;
collecting training information from processing each inquiry and dynamically adapting the models used to produce the candidate results;
adapting the processing based on user-provided corrections for the interpretation for one or more from a group of the context and the inquiry;
adapting the processing based on corrective inquiries from the user after receiving inferior candidate results;
receiving a rule set to adjust the processing; and
identifying common attributes of corrective information for the inquiry among users and generating models specific to one of a group and domain based on the common attributes to produce the candidate results.

8. The computer program product of claim 1, wherein the computer readable program code further causes the processor to:
determine a specific aspect of the context pertinent to the inquiry to retrieve the content.

9. A method of processing an inquiry to provide results satisfying the inquiry comprising:

processing a context using natural language processing to determine an interpretation for the context, wherein the context includes a description of a scenario pertaining to the inquiry and the interpretation for the context includes results of the natural language processing from one or more of parsing, entity detection, and relation detection of the context, and wherein the results of the natural language processing of the context include one or more factors each comprising a context portion including text extracted from the description of the scenario, and a type determined by the natural language processing for each factor comprising a description of the interpretation for the context portion corresponding to the factor;

processing the inquiry using natural language processing to determine an interpretation for the inquiry based on the interpretation for the context;

presenting the interpretation for the inquiry to a user;

in response to an incorrect interpretation for the inquiry:
receiving corrective information for the interpretation for the context from the user, wherein the corrective information for the interpretation for the context includes modifications to the type, extracted text, and relevancy to the inquiry for one or more factors in the results of the natural language processing of the context;

applying the modifications of the corrective information to adjust the results of the natural language processing of the context and modify the interpretation for the context; and processing the inquiry utilizing natural language processing with the modified interpretation for the context to adjust the interpretation for the inquiry;

retrieving content based on the adjusted interpretation for the inquiry and the context to produce candidate results for the inquiry; and iteratively receiving supplemental information for the inquiry to generate updated candidate results.

10. The method of claim 9, wherein the inquiry requests medical information.

11. The method of claim 9, wherein the context includes a structure with a schema defined for one of a problem class and a decision domain, wherein natural language utterances are processed to create the context aligned with the schema.

12. The method of claim 9, wherein presenting the interpretation for the inquiry further comprises:

presenting actions to be performed based on the interpretation for the inquiry to produce the candidate results and receiving modifications for the actions.

13. The method of claim 9, wherein the supplemental information includes one or more from a group of: information pertaining to the context; user input adding, removing, or modifying the context to re-generate candidate results for a previous inquiry in light of altered context; hypotheses proposed by the user to focus the candidate results; and follow-up questions triggered from viewing the candidate results.

14. The method of claim 9, further comprising:

adapting processing to produce the candidate results based on processing of one or more prior inquiries.

15. The method of claim 14, wherein adapting processing to produce the candidate results comprises one or more from a group of:

collecting training information from the processing of the one or more prior inquiries and re-training models used to produce the candidate results;

collecting training information from processing each inquiry and dynamically adapting the models used to produce the candidate results;

adapting the processing based on user-provided corrections for the interpretation of one or more from a group of the context and the inquiry;

adapting the processing based on corrective inquiries from the user after receiving inferior candidate results;

receiving a rule set to adjust the processing; and identifying common attributes of corrective information for the inquiry among users and generating models specific to one of a group and domain based on the common attributes to produce the candidate results.

16. The method of claim 9, further comprising:

determining a specific aspect of the context pertinent to the inquiry to retrieve the content.

17. A system for processing an inquiry to provide results satisfying the inquiry comprising:

a computer system including at least one processor configured to:

process a context using natural language processing to determine an interpretation for the context, wherein the context includes a description of a scenario pertaining to the inquiry and the interpretation for the context includes results of the natural language processing from one or more of parsing, entity detection, and relation detection of the context, and wherein the results of the natural language processing of the context include one or more factors each comprising a context portion including text extracted from the description of the scenario, and a type determined by the natural language processing for each factor comprising a description of the interpretation for the context portion corresponding to the factor;

process the inquiry using natural language processing to determine an interpretation for the inquiry based on the interpretation for the context;

present the interpretation for the inquiry to a user;

in response to an incorrect interpretation for the inquiry:

receive corrective information for the interpretation for the context from the user, wherein the corrective information for the interpretation for the context includes modifications to the type, extracted text, and relevancy to the inquiry for one or more factors in the results of the natural language processing of the context;

apply the modifications of the corrective information to adjust the results of the natural language processing of the context and modify the interpretation for the context; and process the inquiry utilizing natural language processing with the modified interpretation for the context to adjust the interpretation for the inquiry;

retrieve content based on the adjusted interpretation for the inquiry and the context to produce candidate results for the inquiry; and iteratively receive supplemental information for the inquiry to generate updated candidate results.

18. The system of claim 17, wherein the at least one processor is configured to adapt processing to produce the candidate results based on processing of one or more prior inquiries by one or more from a group of:

collecting training information from the processing of the one or more prior inquiries and re-training models used to produce the candidate results;

collecting training information from processing each inquiry and dynamically adapting the models used to produce the candidate results;

adapting the processing based on user-provided corrections for the interpretation for one or more from a group of the context and the inquiry;

adapting the processing based on corrective inquiries from the user after receiving inferior candidate results;

receiving a rule set to adjust the processing; and identifying common attributes of corrective information for the inquiry among users and generating models specific to one of a group and domain based on the common attributes to produce the candidate results.

19. The system of claim 17, wherein the context includes a structure with a schema defined for one of a problem class and a decision domain, wherein natural language utterances are processed to create the context aligned with the schema.

20. The system of claim 17, wherein the at least one processor is configured to present the interpretation for the inquiry by:

presenting actions to be performed based on the interpretation for the inquiry to produce the candidate results and receiving modifications for the actions.

* * * * *